United States Patent [19]

Huggard

[11] Patent Number: 4,710,522

[45] Date of Patent: Dec. 1, 1987

[54] FOAMABLE COMPOSITION AND PROCESS FOR FORMING SAME

[75] Inventor: Mark T. Huggard, Mechanicsville, Va.

[73] Assignee: Mobil Oil Corporation, New York, N.Y.

[21] Appl. No.: 917,341

[22] Filed: Oct. 9, 1986

Related U.S. Application Data

[62] Division of Ser. No. 766,226, Aug. 16, 1985, abandoned.

[51] Int. Cl.$^4$ ................................................ C08J 9/08
[52] U.S. Cl. ...................................... 521/138; 521/79; 521/81; 521/180; 521/182; 525/439; 525/535
[58] Field of Search ............... 521/138, 81, 180, 182; 525/439, 535

[56] References Cited

U.S. PATENT DOCUMENTS

| | | | |
|---|---|---|---|
| 3,470,114 | 9/1969 | Siggel et al. | 521/138 |
| 4,097,425 | 6/1978 | Niznik | 521/138 |
| 4,174,432 | 11/1979 | Niznik | 521/138 |
| 4,462,947 | 7/1984 | Huggard | 521/138 |
| 4,466,933 | 8/1984 | Huggard | 521/81 |
| 4,544,677 | 10/1985 | Allen et al. | 521/91 |

*Primary Examiner*—Morton Foelak
*Attorney, Agent, or Firm*—Alexander J. McKillop; Michael G. Gilman; Charles J. Speciale

[57] ABSTRACT

Foamable and foamed compositions comprising blends of an aromatic sulfone polymer, a linear polyester and an aromatic polycarbonate are disclosed. The composition, useful as an ovenable food container, is formed in a process in which the three components are intimately admixed, heated and extruded below or above the foamable temperature, depending upon whether a foamable or foamed composition is desired.

6 Claims, No Drawings

FOAMABLE COMPOSITION AND PROCESS FOR FORMING SAME

This is a divisional of copending application Ser. No. 766,226, filed on Aug. 16, 1985, now abandoned.

BACKGROUND OF THE INVENTION

1. Field of the Invention

The instant invention is directed to a foamable and foamed composition and process for forming same. More particularly, the instant invention is directed to a foamable and foamed composition which includes an aromatic sulfone polymer, a linear polyester and an aromatic polycarbonate and a process of forming the compositions.

2. Background of the Prior Art

Of the engineering plastics, which are the high strength thermoplastics, the class of aromatic sulfone polymers is one of the most outstanding in terms of high temperature performance. That is, aromatic sulfone polymers can be utilized at elevated temperatures, above those at which other engineering plastics fail. This property suggests many unique uses for this resin. One such use, recently developed with the growth of microwave ovens, is food containers for prepackaged frozen food and the like. In the past frozen food packages were constructed of aluminum and other light weight metals. These packages easily withstood the elevated temperatures of standard gas or electrically heated cooking ovens. However, these metal containers cannot be used to heat foods contained therein by microwave energy. As those skilled in the art are aware, the high dielectric constant of metals result in a preferential absorption of the microwave energy by the metal covering the food preventing the heating effect of the microwave energy from penetrating to the food.

No such detriment exists when plastics are employed. Those skilled in the art are aware that plastics have very low dielectric constants. Microwave energy penetrates plastic packages without absorption so that the energy is focused on heating the foods contained therein. Thus, the use of a strong, high temperature resistant plastic such as aromatic sulfone polymers is suggested in this application.

The above analysis does not encompass two detrimental effects of using aromatic sulfone polymers. Engineering plastics, such as aromatic sulfones, are relatively high priced. In a mass market such as one involving preprepared foods, the high cost of packaging material is a critical factor. Equally significant in this application is handling of these packages. The criticality of lightweight packaging in handling the large numbers of prepackaged food containers involved in this application is readily apparent. Thus, the use of a conventional aromatic sulfone polymer package, in spite of the advantages noted above, is discouraged.

These detrimental factors can be overcome by using a foamed aromatic sulfone polymer. A foamed aromatic sulfone polymer is less dense. The same sized package could be produced at significantly decreased weight. At the same time the lower density of a foamed product decreases the aromatic sulfone polymer cost per package in direct proportion to the decrease in density of the foamed polymer compared to the density of the unfoamed product. However, prior success with foaming of sulfone polymers in the prior art would suggest abandonment of such a project.

As those skilled in the art are aware, typical foaming agents, often referred to as blowing agents, are usually toxic agents. The incorporation of these agents in food containers is therefore unacceptable. Even if non-toxic blowing agents were available which could pass stringent constraints, still the chemical blowing agents known in the art present serious processing conditions when added to engineering plastics. The addition of chemical blowing agents to engineering plastics require extreme processing conditions. For one thing, the presence of moisture results in degradation of the product produced. For another, chemical blowing agents are typically powders. In order to have a uniform foamed product, the foaming agent must be uniformly dispersed. To uniformly disperse a powder is a very difficult, and often, insoluble problem. Thus, the utilization of blowing agents oftentimes yields non-uniform foamed products.

While the above problems, associated with engineering plastics in general, are indeed formidable, they pale when foaming of an aromatic sulfone is attempted. Aromatic sulfone polymers, like other engineering plastics, are foamed by extruding the plastic with a foaming agent. The known chemical blowing agents, however, yield their gaseous product at relatively low temperatures. On the other hand, to extrude an aromatic sulfone requires a temperature in the range of about 250° C. At atmospheric pressure, chemical blowing agents not only react to give off their gaseous product at temperatures significantly below 250° C., resulting in premature foaming, but, more fundamentally, chemical blowing agents decompose at temperature below 250° C. In sum, the known blowing agents of the prior art cannot be employed to foam aromatic sulfone polymers.

The foaming of engineering plastics other than aromatic sulfones is known in the prior art. Particularly, the foaming of polyethylene terephthalate is disclosed in U.S. Pat. No. 3,470,114, issued to Siggel et al. This patent is directed to a process for producing foamed polyethylene terephthalate by the addition thereto of an aromatic polycarbonate to which it is reacted at elevated temperature.

U.S. Pat. Nos. 4,462,947 and 4,466,933, each issued to the inventor of the present invention, discloses a similar product, a foamed polyethylene terephthalate formed by the reaction of polyethylene terephthalate with an aromatic polycarbonate to produce a foamed product. This product is subjected to crystallization annealing to produce lightweight products usable as food containers.

Although these teachings advance the art, those skilled in the art are aware of the clear superior high temperature properties of aromatic sulfones, compared to polyethylene terephthalate. However, the teachings of the prior art also suggest that making a foamed aromatic sulfone polymer presents such formidable problems that the substitution of aromatic sulfone polymer containers for polyethylene terephthalate containers, although desirable, is so difficult as to make such substitution highly unlikely.

SUMMARY OF THE INVENTION

It has now been discovered that foamable and foamed aromatic sulfone polymer can be prepared without the use of chemical blowing agents. Thus, the formidable barrier to producing a foamable and foamed aromatic sulfone polymer is overcome by sidestepping traditional foaming methods. Instead, a foaming method, using non-toxic materials, which can be easily handled at elevated temperatures and which does not result in premature foaming during resin drying prior to processing overcomes the earlier processing difficulties associated with making aromatic sulfone in the past. With the removal of difficult processing barriers, a foamed aromatic sulfone polymer can be prepared which has superior high temperature properties making this polymer the material of choice in the ovenable food container field.

In accordance with the present invention a foamable composition is provided. The foamed composition includes an admixture of an aromatic sulfone polymer, characterized by the presence of both aryl ether and aryl sulfone linkages in the polymer backbone; a high molecular weight linear polyester which is a polycondensation product of an aromatic dicarboxylic acid and a glycol; and a high molecular weight linear aromatic polycarbonate represented by the repeating structural unit of the formula:

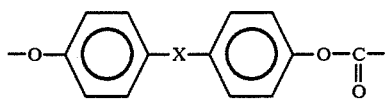

where X is a divalent hydrocarbon radical with a total of from 2 to 9 carbon atoms selected from the group consisting of

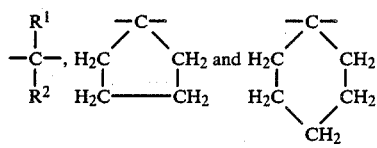

in which $R^1$ is hydrocarbon or lower alkyl; and $R^2$ is phenyl or $C_1$-$C_7$ alkyl.

In further accordance with the instant invention a foamed composition is provided having the same constituency.

In still further accordance with this invention a process for making a foamed article is taught. In this process the three polymeric components recited above are blended into a homogeneous mixture. The homogeneous mixture is heated to a temperature in the range of 250° C. to 350° C. and the heated homogeneous mixture is extruded into a foamed article.

In yet still further accordance with the present invention a process for making a foamable composition is disclosed. In this process the three polymeric compounds, which form the foamable composition, are blended into a homogeneous mixture. The mixture is heated to a temperature below 250° C. and the heated homogeneous mixture is extruded into a foamable composition.

DETAILED DESCRIPTION

The present invention is directed to a foamable and foamed composition comprising an admixture of an aromatic sulfone polymer, a linear polyester and an aromatic polycarbonate.

The generic class of compounds denoted as aromatic sulfone polymers include a class of aromatic sulfone thermoplastic polymers which are characterized by the incorporation therein of both aryl ether (ArOAr) and aryl sulfone ($ArSO_2Ar$) linkages in the polymer backbone. Specific commercial aromatic sulfones within the contemplation of the present invention include the polymer denoted as polysulfone. This polymer is formed by the reaction of the sodium salt of bisphenol A with 4,4'-dichlorodiphenyl sulfone in a mixed solvent of chlorobenzene and dimethylsulfoxide. Another aromatic sulfone encompassed by this invention is polyether sulfone, formed by condensation of diphenyl ether with the disulfonyl chloride of diphenyl ether. Polyarylsulfone, a copolymer very similar to polyether sulfone, is characterized by the incorporation of rigid biphenyl units in the polymer by copolymerizing the sulfonyl chlorides of biphenyl and diphenyl ether. Polyphenyl sulfone, which is produced in a method similar to the formation of polysulfone, is formed by the reaction of an alkali metal salt of bisphenol A, preferably the sodium salt, with a 4,4'-dichlorodiphenylsulfone having strongly electron-withdrawing groups, such as carbonyl, azo, sulfonamido and nitro groups, ortho or para to the chlorine atoms.

Obviously, other polymers, outside the group of the commercial polymers enumerated above but within the generic class of aromatic sulfones, may be employed in the composition of the present invention. Thus, any polymer which have both aryl ether and aryl sulfone linkages in the polymer backbone is within the contemplation of the present invention.

Although all aromatic sulfone polymers are within the contemplation of this invention, polyether sulfone, polysulfone, polyaryl sulfone and polyphenyl sulfone are preferred. Of these, polyether sulfone is most preferred.

A second component of the foamed composition of the present invention is a high molecular weight linear polyester. Linear polyesters, within the contemplation of the present invention, are polycondensation products of dicarboxylic acid and a glycol. Although the linear polyesters of the present invention are preferably the polycondensation product of an aromatic dicarboxylic acid, an aliphatic dicarboxylic acid may be utilized. However, when an aliphatic dicarboxylic acid is used, it should be used in combination with an aromatic dicarboxylic acid and then only in a concentration of not more than 15%, preferably less than 5% by weight. A preferred dicarboxylic acid is terephthalic acid. The glycol, reacted with the dicarboxylic acid to produce the linear polyester, is generally designated by the formula $HO(CH_2)_nOH$, where n is an integer of 2 to 12. Preferred glycols include ethylene glycol, 1,4-butanediol and the like.

Of the linear polyesters within the contemplation of the present invention, polyethylene terephthalate is particularly preferred.

In general, the aromatic polycarbonates of the composition of this invention are a well-recognized class of polymers, referred to as "aromatic polyesters of carbonic acid" by H. Schnell in *Angewandte Chemie*, Vol. 68, No. 20 pp. 633–660, Oct. 21, 1956, and subsequently designated more simply by the term "aromatic polycarbonates" in the book by the same author entitled "Chemistry and Physics of Polycarbonates," Interscience Publishers, New York (1964). The article and the book are both incorporated by reference in order to avoid undue repetition regarding the matter in which the aromatic polycarbonates are prepared, their physical and chemical properties and other detailed information concerning these polymers and their precursors. In general, these polycarbonate polymers are essentially linear synthetic polyesters of organic dicarboxylic acids and organic dihydroxy compounds.

The preferred aromatic polycarbonates of this invention are the linear condensation product of carbonic acid with a 4,4'-dihydroxy-diphenyl-alkane, a 4,4'-dihydroxytriphenyl-alkane or a 4,4'-dihydroxy-diphenyl-cycloalkane in which the bridging group between the hydroxy-substituted phenyl nuclei contains between 2 and 9 carbon atoms free of aliphatic unsaturation. More particularly, the preferred aromatic polycarbonates are those linear polymers defined by the repeating structural unit of the formula

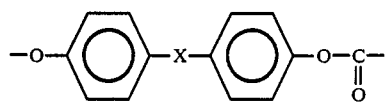

where X is a divalent hydrocarbon radical having 2 to 9 carbon atoms selected from the group consisting of:

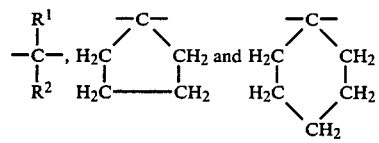

in which $R^1$ is hydrogen or lower alkyl; and $R^2$ is phenyl or $C_1$-$C_7$ alkyl. These aromatic polycarbonates have molecular weights of from about 18,000 to 500,000 or higher. More desirably, the average molecular weight of the polycarbonates of this invention are between 20,000 and 250,000. Most preferably, the molecular weight of the polycarbonates of this invention are between 25,000 and 150,000.

In a preferred embodiment, the polycarbonates of the present invention are obtained from bisphenol A (4,4'dihydroxy-diphenyl-2,2-propane). Another preferred compound, reacted with carbonic acid, is 4,4'-dihydroxy-diphenylmethyl-phenyl-methane. Other suitable, if less preferred, aromatic polycarbonates include those derived as the carbonic acid esters of the following dihydroxy aromatic compounds: 4,4'-dihydroxy-diphenyl-1,1-ethane; 4,4'-dihydroxy-diphenyl1,1-butane; 4,4'-dihydroxy-diphenyl-1,1-isobutane; 4,4'-dihydroxy-diphenyl-1,1-cyclopentane; 4,4'-dihydroxy-diphenyl-1,1-cyclohexane; 4,4'-dihydroxy-diphenyl-phenyl-methane; 4,4'-dihydroxy-diphenyl-2,2-butane; 4,4'-dihydroxy-diphenyl2,2-pentane; 4,4'-dihydroxy-diphenyl-2,2-hexane; 4,4'-dihydroxy-diphenyl-2,2-isohexane; 4,4'-dihydroxy-diphenyl-2,2heptane; 4,4'-dihydroxy-diphenyl-2,2-octane; 4,4'-dihydroxydiphenyl-2,2-nonane; 4,4'-dihydroxy-diphenyl-ethyl-phenylmethane; 4,4'-dihydroxy-diphenyl-3,3-pentane; and 4,4'dihydroxy-diphenyl-4,4-heptane.

The common feature of all the aromatic polycarbonates within the contemplation of this invention are that they decompose and release carbon dioxide in the presence of the linear polyester when heated to temperature of about 250° C. to 350° C. It is noted that the polycarbonates of this invention in the absence of other components are stable at these temperatures. Thus, the aromatic polycarbonates of this invention when admixed uniformly with linear polyesters of the present invention are capable of acting as autogeneous foaming agents even though the homopolymers of these carbonates require the addition of a distinct foaming agent or at least a recognizable unstable gas-liberating compound before any foaming takes place.

The composition of the present invention comprises at least 90 weight percent of an aromatic sulfone polymer, based on the total weight of the composition. More preferably, the composition of the present invention is at least 95 weight percent aromatic sulfone polymer, based on the total weight of the composition. Most preferably, the present composition incorporates at least 97.5 weight percent aromatic sulfone polymer, based on the total weight of the composition. When recitation of at least 90, 95 and 97.5 weight percent is made, it should be appreciated that implicitly recitation of less than 100 weight percent is also made. Obviously, the absence of the linear polyesteraromatic polycarbonate would be outside the scope of this invention. Correspondingly, the remaining two constituents, the linear polyester and the aromatic polycarbonate comprises 0.5 to 10 percent by weight of the composition, based on the total weight of the composition. More preferably, the polyester-polycarbonate constituent represents 0.75 to 5% by weight of the total composition.

Still more preferably, the linear polyesteraromatic poly-carbonate contribution to the total weight of the composition is in the range of between 0.85 and 2.5 percent by weight.

Most preferably, the total concentration of linear polyester and aromatic polycarbonate in the composition of this invention is in the range of between about 1 and 2 percent by weight.

In terms of the relative concentration of the linear polyester and aromatic polycarbonate, these constituents are present such that the weight ratio of linear polyester to aromatic polycarbonate is in the range of between 1:19 and 19:1, respectively. More preferably, the weight ratio of linear polyester to aromatic polycarbonate is in the range of between about 1:3 and 3:1. Still more preferably, the weight ratio of linear polyester to aromatic polycarbonate is in the range of between about 2:3 and 3:2.

The process of forming the foamed composition of the present invention involves homogeneously mixing the three components of the composition and heating them above the softening point of the mixture. In general, the reaction for releasing carbon dioxide from the polycarbonate and thus forming a foamed composition involves heating the mixture to a temperature of at least 250° C., usually a temperature in the range of between 250° and 350° C. Preferably, the temperature of the composition is raised to between about 270° C. and 350° C. to effect foaming. This heating step occurs in an at least partially enclosed mold, extruder or similar reaction zone. The retention time in the reaction zone can be relatively short, e.g., from about 1 minute up to about 15 minutes, preferably from about 1.3 to 1.5 minutes at the higher end of the above-recited temperature range and about 10 to 12 minutes at the lower end of the usual temperature range for foaming. Temperatures above 350° C. should ordinarily be avoided to prevent unnecessary damage to the linear polyester.

Although mixing and foaming may occur in a single operation it is oftentimes preferred to initially prepare a foamable composition in granule form. In forming a foamable composition the three components are initially mixed at elevated temperature. Obviously, the maximum mixing temperature is limited by the temperature above which foaming occurs. Since foaming is initiated at about 270° C., initial mixing occurs below about 270° C., preferably below about 250° C. Homogeneous mixing preferably takes place in a screw extruder, a mixer or a kneader. Of course, any device that effects homogeneous mixing may be utilized. In a preferred embodiment of the process of making a foamable composition, the homogeneously mixed composition is extruded into sheets, rods and the like. The sheets, rods, etc. are then chopped or granulated into granules for easy storage and handling. As long as the granules are kept below foamable temperature, i.e., below 250° C., they may be stored for indefinite periods of time without danger of either foaming or losing their ability to foam at foamable temperature.

Independent of whether mixing and foaming occurs in a single step or in separate mixing and foaming steps, the step of foaming preferably takes place in a screw injection molding machine. This machine is preferred in that best homogenization or plasticizing of the aromatic sulfone-linear polyester-polycarbonate mixture is achieved in a screw or worm mixer. Moreover, a screw injection molding machine facilitates both mixing, foaming and molding in a single continuous operation. The same advantages are achieved by processing the mixture in an extruder with an attached injection mold. Another preferred apparatus for conducting the process of the present invention is a piston injection molding machine, provided the mixture is first homogenized, at temperature below the foamable temperature range, in an extruder or similar mixing device.

The process of the present invention can also be carried out in an extruder without an attached injection mold. In this embodiment, the aromatic sulfone-polyesterpolycarbonate mixture is homogenized and heated to release carbon dioxide under super atmospheric pressure in a screw or worn extruder and then extruded or drawn off therefrom at atmospheric pressure so that the soften extruded mass rapidly foams and resolidify into the desired extruded shape. Thus, foamed composition can be produced as rods, bands, sheets and the like with regular or irregular profiles depending upon the die opening of the extruder.

Whatever the device employed, the mixture is disposed in the preferred apparatus and heated to a temperature of preferably between 270° C. and 350° C. In the preferred embodiment wherein injecting molding occurs, the injection mold may be connected, at the outlet side of the processing machine, to a vacuum. This processing step results in a uniform pore size or cell structure. Thus, in a preferred embodiment, the injection mold is evacuated to a pressure in the range of between 5 and 300 mm. Hg, and more preferably, about 50 to 100 mm. Hg. Although this evacuation can occur before or during injection of the composition, it is preferred that evacuation occur after the mold has been injected with the hot foamable mass so as to achieve especially uniform pores or cells. If different density injection molded foam products are desired, this is accomplished by varying the weight of material charged into a mold of constant volume. Obviously, as the weight of the charge or "shot capacity" increases in a constant volume mold, the density of the foam product likewise increases. With this increase in density there is a corresponding decrease in pore size regardless of the pressure difference before and after application of the vacuum. With a sufficiently high density, it is possible to achieve a molded foam product of the type classified as a rigid, brittle and open-celled foam structure with a closed outer skin or surface.

In a preferred embodiment of the present invention a thermoformed foamable composition is prepared. In this embodiment the foamable composition is extruded into sheet material. Foaming generally occurs the instant the softened composition is subjected to sufficient foaming pressure. That pressure is reached upon contact with atmospheric pressure which occurs the instant the composition leaves the extrusion die. The foamed sheet is immediately cooled on a chill roll maintained at a temperature in the range of between about 20° C. and 50° C. The thus cooled foamed sheet is then heated to a temperature above the glass transition temperature of the aromatic sulfone polymeric constituent of said sheet. Glass transisition temperatures for aromatic sulfone polymers are provided in standard references. For example, the glass transition temperature for commercially available aromatic sulfone polymers is provided in Modern Plastics Encyclopedia, 1984-85 Edition, p.478, McGraw Hill Publishing Co., New York, which is incorporated herein by reference. The heated sheet, in turn, is thermoformed in a mold under a pressure of up to 5 atmospheres.

The following examples are provided to illustrate the scope and spirit of the present invention. Since these examples are given for illustrative purposes only, the scope of the present invention should not be limited thereto.

EXAMPLE 1

A blend of 99.5 parts of Victrex [trademark] 200P polyether sulfone (PES); 0.25 parts of Goodyear VFR [trademark] 10024AS polyethylene terephthalate (PET); and 0.25 part Merlon [trademark] M39-F aromatic polycarbonate (AP), all parts being by weight, were dried, blended and extruded in a 1½ inch extruder equipped with a water chilled cast roll. The product extruded was a foamed composition having a density of 1.37 grams per cubic centimeter.

The results of this example are summarized in Table 1.

EXAMPLES 2-4

Example 1 was repeated but for the relative amounts of the three components of the composition. In Example 2, 99 parts of Victrex [trademark] 200P; 0.5 part of VFR [trademark] 10024AS and 0.5 part of Marlon [trademark] M39F, all parts being by weight, were charged into the extruder.

In Example 3, using the same brands as in Examples 1 and 2, 98.7 parts by weight of PES; 0.625 parts by weight of PC; 0.625 part of PET; and 0.625 part by weight of PC were charged in the extruder.

In Example 4, using the same brand polymers as in Examples 1, 2, and 3, 97.5 parts by weight of PES; 1.25 parts by weight of PET; and 1.25 parts by weight of PC were charged into the extruder.

In each case a foamed product resulted whose density was determined. The resultant density of the foamed product formed in accordance with each of Examples 2-4 is summarized in Table 1.

COMPARATIVE EXAMPLE

A composition constituting only Victrex [trademark] 200P PES was charged into the same extruder used in Examples 1-4. No PET or PC was included in the material charged into the extruder. The resultant extruded product was unfoamed having a density of 1.41 grams per cc. The results of this example are also incorporated in Table 1 below:

TABLE 1

| Components, parts by wt. | CE | 1 | 2 | 3 | 4 |
|---|---|---|---|---|---|
| Polyether Sulfone | 100 | 99.5 | 99.0 | 98.75 | 97.5 |
| Polyethylene Terephthalate | 0 | 0.25 | 0.5 | 0.625 | 1.25 |
| Polycarbonate | 0 | 0.25 | 0.5 | 0.625 | 1.25 |
| Foamed Density of Product, g/cc | 1.41* | 1.37 | 1.17 | 0.81 | 0.67 |
| Reduction in Density, % (calculated) | — | 3 | 17 | 43 | 52 |

*Unfoamed

DISCUSSION OF RESULTS

The examples establish the effectiveness of polyethylene terephthalate-aromatic polycarbonate as foaming agent in the foaming of polyether sulfone. In each of Examples 1–4, wherein these constituents were utilized, foaming was effected. Examples 1–4 evidence reduction in density ranging from 3 to 52 percent depending upon the concentration of the in-situ foaming agent, polyethylene terephthalate-aromatic polycarbonate. Clearly, all concentrations ranges embodied in Examples 1–4 produce attractive density reduction.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the instant invention should be limited only by the appended claims.

What is claimed is:

1. A foamable composition comprising an admixture of an aromatic sulfone polymer, said aromatic sulfone characterized by the presence of both aryl ether and aryl sulfone linkages in the polymer backbone; a high molecular weight linear polyester which is a polycondensation product of an aromatic dicarboxylic acid and a glycol; and a high molecular weight linear aromatic polycarbonate represented by the repeating structural unit of the formula

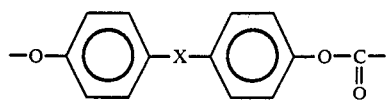

wherein X is a divalent hydrocarbon radical with a total of from 2 to 9 carbon atoms selected from the group consisting of

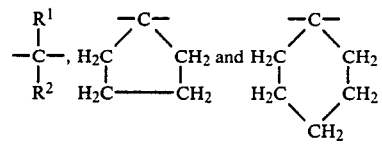

where $R^1$ is hydrogen or lower alkyl; and $R^2$ is phenyl or $C_1$–$C_7$ alkyl, said composition free of any chemical non-polymeric blowing agent.

2. A composition in accordance with claim 1 wherein said admixture comprises at least 90 percent, but less than 100% by weight, of said aromatic sulfone polymer, said percentage based on the total weight of said admixture.

3. A composition in accordance with claim 2 wherein said linear polyester and said aromatic polycarbonate are present in a concentration such that the weight ratio of linear polyester to aromatic polycarbonate is in the range of between 1:19 and 19:1.

4. A composition in accordance with claim 2 wherein said linear polyester and aromatic polycarbonate comprises 0.5 to 10 percent by weight, based on the total weight of said admixture.

5. A composition in accordance with claim 4 wherein said linear polyester and said aromatic polycarbonate comprises between 0.85 and 2.5 percent by weight, based on the total weight of said admixture.

6. A composition in accordance with claim 1 wherein said aromatic sulfone polymer is polyether sulfone; said linear polyester is polyethylene terephthalate; and said aromatic polycarbonate is the linear condensation product of carbonic acid and bisphenol A.

* * * * *